United States Patent Office 3,375,279
Patented Mar. 26, 1968

3,375,279
DIALKYNYL AMINES
James F. Vitcha, New Providence, and George L. Moore, South Plainfield, N.J., assignors to Air Reduction Company, Incorporated, New York, N.Y., a corporation of New York
No Drawing. Original application Feb. 20, 1961, Ser. No. 90,209, now Patent No. 3,268,524, dated Aug. 23, 1966. Divided and this application Mar. 10, 1965, Ser. No. 438,716
12 Claims. (Cl. 260—577)

ABSTRACT OF THE DISCLOSURE

Dialkynyl amines are prepared by a process which comprises forming an anhydrous mixture of paraformaldehyde, an inert hydrocarbon solvent, and a catalyst selected from the group consisting of catalytically-active salts and acetylides of the heavy metals of subgroups I-B and II-B of the Periodic Table of Elements, adding an atmosphere of acetylene on said mixture, and gradually adding to said mixture a primary hydrocarbyl amine having up to 20 carbon atoms, said amine being selected from the group consisting of aliphatic amines and monocyclic aromatic amines, and mixtures of the foregoing, said amine being added to said mixture at a uniform rate and at a temperature between about 40° C. and 90° C. and a pressure between about 2 and 40 atmospheres, the rate of addition of said amine being such that substantially no excess of unreacted amine is present in said reaction mixture.

*Cross-reference to related application*

This is a division of application Serial No. 90,209, filed February 20, 1961, now U.S. Patent 3,268,524, dated August 23, 1966.

This invention relates to acetylenic nitrogen compounds, more particularly dialkynyl amines, and to improved methods of preparing such compounds.

Procedures are known for the preparation of nitrogen compounds of the acetylene series, i.e., nitrogen compounds having triple unsaturated carbon linkages, by the reaction of amines, acetylene and aldehydes. However, such procedures have not, in general, proved commercially feasible. The yields in these prior art methods, for example, tend to be low, and, moreover, because of the nature of the prior art reactions, side products and by-products are formed to a considerable extent, and great difficulty is experienced in recovering the desired reaction products.

According to the present invention commercially feasible procedures for preparing nitrogen compounds of the acetylene series which avoid or alleviate many of the problems encountered in the prior art have been discovered.

In accordance with the present invention there have been prepared dipropargyl amines of the formula

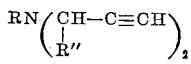

In the foregoing formula, M may be an aliphatic, aryl, alkyl aryl or alicyclic hydrocarbon radical.

R will usually have fewer than 20 and preferably fewer than 10 carbon atoms in the chain. Typically, R may be an aliphatic hydrocarbon radical, such as propyl, isopropyl, n-butyl, isobutyl, tertiary butyl, hexyl, 2-ethylhexyl, isononyl, n-nonyl, 3,5,5-trimethylpentyl, 1,1,3,3-tetramethylbutyl, and the like, including the isomeric alkyl derivatives thereof. R may also be an alicyclic hydrocarbon radical, such as cyclopentyl, cyclohexyl, cycloheptyl, cyclooctyl, and the like. When R is an aryl or alkyl aryl group, these may have one or more uncondensed benzene nuclei. Preferably, however, R has one uncondensed benzene nucleus. Typical of such groups may be mentioned phenyl and its homologues, such as tolyl, xylyl, and the like.

In the formula above, R" may be hydrogen or a lower alkyl radical having up to 6 carbon atoms. Usually R" will be hydrogen, as will be clear from the following description.

As will be more clear from the following description, the group R, in the above formula will correspond to the radicals making up the primary amine used to prepare the acetylenic nitrogen compounds. The group R" will correspond to the hydrocarbon radical making up the carbonyl compounds used in the reactions, or hydrogen.

These and other amino compounds of the acetylene series, i.e., amino compounds having triple unsaturated carbon linkages, are prepared by reacting a primary amine having two active hydrogen atoms attached to the amino nitrogen, aldehydes and acetylene in an inert reaction medium and in the presence of catalysts.

A typical reaction mechanism for the compounds represented in the foregoing formula may be represented as follows:

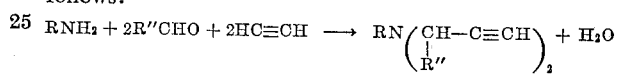

As catalysts suitable for carrying out the above reaction may be mentioned the heavy metals of subgroups I-B and II-B of the Periodic Table of Elements and their compounds, as, for example, organic and inorganic salts of copper and the other heavy metals of these subgroups, such as the chloride, acetate, formate, and the like. Also may be mentioned the acetylides of such heavy metals, for example, acetylene-copper compounds. Other catalysts, such as Adkins Catalyst, i.e., copper-barium chromite, may also be used. Among the catalysts, the copper salts, and more particularly the cupric salts, are especially suitable. Particularly good results are obtained with cupric chloride, and this material is preferred.

The catalysts or mixtures thereof may, if desired, be used with suitable inert carriers, such as, for example, finely-divided alumina, diatomaceous earth, silica, silica gel, kieselguhr, and mixtures of the foregoing.

Primary hydrocarbyl amines and mixtures thereof are useful in preparing the acetylenic amino compounds described herein. When aliphatic amines are used, these may be primary amines having straight chains or branched chains typified, as partially indicated above, by the following: methyl, ethyl, propyl, isopropyl, n-butyl, isobutyl, tert.-butyl, hexyl, 2-ethylhexyl, isononyl, n-nonyl, 3,5,5-trimethylpentyl, 1,1,3,3-tetramethylbutyl groups and the isomeric alkyl derivatives thereof. Both primary aryl or alkyl aryl amines may be used, depending upon the type of acetylenic amino compounds desired. Of the aryl compounds, the aromatic amines having a single benzene nucleus are preferred. Among these may be mentioned aniline, toluidine, and xylidine. Typical of the alicyclic amines may be mentioned cyclopentylamine, cyclohexylamine, cycloheptylamine, cyclooctylamine, and the like. The primary amines used preferably have fewer than a total of 20 carbon atoms. Other suitable amines will readily suggest themselves to those skilled in the art from the foregoing description.

The reaction of the above described amino nitrogen compounds with acetylene and aldehydes is carried out in an inert solvent medium. Care should be exercised in selecting the solvent to prevent undesirable by-product and side-product formation and to avoid tedious recovery procedures. It has also been discovered that the choice of reaction medium has a significant effect on the yields achieved.

In general, non-polar solvents which are inert to both the starting materials and the reaction products and which are readily volatilizable may be used. Among such solvents, saturated or unsaturated aliphatic hydrocarbons which are liquid at atmospheric conditions are especially suitable. Preferred for use are saturated aliphatic hydrocarbons having 6 to 19 carbon atoms.

The aldehydes suitable for use in the present invention may be described as simple aldehydes having one carbonyl radical. Although carrying out the reaction with aldehydes containing more than 1 carbonyl radical is feasible, in general, the use of such materials causes undesirable side reactions. Among the particularly important aldehydes may be mentioned formaldehyde, including formalin (an aqueous solution of about 37 percent by weight of formaldehyde) and Methyl Formcel (a solution of about 55 percent by weight of formaldehyde in methanol), acetaldehyde, and other simple aldehydes having fewer than about 6 carbon atoms. The precursors of formaldehyde, e.g., the cyclic trimer known as trioxan, and the linear polymers of formaldehyde, known as polyoxymethylenes, as well as the cyclic polymer of acetaldehyde, known as paraldehyde, may be advantageously employed.

Although any of the above described aldehydes may be used, it has been discovered that greatly superior results are obtained in preparing compounds of the formula described hereinabove when linear polymers of formaldehyde are used. Such polymers are polyoxymethylenes of the formula $HOCH_2-O-[CH_2O]_n-CH_2OH$, where $n$ is an integer up to 100. Especially good results are obtained when trioxymethylene, which is commonly referred to as paraformaldehyde, is employed, and this material is preferred.

The acetylene used in the reaction may be highly concentrated acetylene, or acetylene diluted with foreign gases which are inert to the reaction. Electric arc acetylene, for example, may be used.

The method of contacting the reactants is important. Thus, it has been discovered that greatly improved yields are obtained by suspending the aldehyde in an inert non-polar solvent containing the catalyst, subjecting this reaction medium to an atmosphere comprising acetylene, and adding the amine to the resulting environment.

Care should be taken in adding the amine to avoid the presence of excess unreacted amine in the reacting medium. Thus, too rapid an addition of the amine results in decreased yields of desirable products and production of by-products, side products and tars. The rate of addition of the amine should be slow enough so as to avoid the presence of excess unreacted amine in the reaction mixture. In general, the rate of addition of the amine should be such that at any given time less than about 25 mole percent, and preferably less than about 10 mole percent of unreacted amine is present in the reaction mixture, based upon the moles of unreacted aldehyde in the reaction mixture. The rate of addition of the amine, in terms of moles of amine per minute per mole of aldehyde in the reaction mixture, may vary between about 0.0005 and 0.15, is usually between about 0.005 and 0.015, and is preferably between about 0.0025 and 0.030.

The proportion of amine to aldehyde is also important. In general, the molar ratio of amine to aldehyde may vary between about 0.80 and 1.20:1 and is preferably between about 1.0 and 1.10:1. When polymers of the aldehydes are employed, the above described molar ratios are based upon moles of equivalent aldehyde and not moles of the polymers. When paraformaldehyde is used, for example, a molar ratio of amine to paraformaldehyde of between about 1.0 and 1.10:1 is preferred, and a molar ratio of about 1.05:1 is optimum, the molar ratios being based on HCHO.

If desired, the reaction may be carried out under anhydrous conditions, and in some instances, this may be preferable. Any suitable dehydrating agent which is inert to reactants and to the products of reaction may be used to take up the water produced by the reaction. Such dehydrating agents are well understood in the art. As a typical example may be mentioned anhydrous sodium sulfate.

The temperature and pressure of reaction should be high enough to cause reaction to occur, but below the temperature and pressure at which tar and undesirable side products and by-products form. The temperature of reaction may vary between about 40° C. and 90° C., or higher, and is preferably between about 50° C. and 60° C. At the lower part of the range, the reaction appears to be sluggish, while at the upper part of the range, secondary products, as well as side products and tars, tend to form. Although the reaction may be carried out at pressures between about 2 and 40 atmospheres, reaction pressures of between about 125 to 250 p.s.i.g. are especially advantageous, and are preferred.

In the past, difficulty has been encountered in reacting primary amines, carbonyl compounds and acetylene to produce acetylenic amino compounds. Under certain conditions suggested by the prior art, for example, primary amines reacted poorly; under other conditions reactions of primary amines with acetylene are quite good, but the desired products, although apparently formed, appear to condense or polymerize to high boiling products.

In spite of the foregoing, it has been discovered that an excellent reaction occurs when primarily amines, carbonyl compounds and acetylene are reacted under the conditions described hereinabove in connection with the secondary amines. The reactions with the primary amines are slightly more exothermic and acetylene up-take is more rapid.

The invention will be more fully understood from the following examples, which, although illustrative, are not intended to limit the scope of the invention, except as such limitations may appear in the claims.

*Example 1*

The reactor comprises a one-liter, upright, stainless steel autoclave equipped with an agitator, thermocouple well, acetylene gas burette, liquid amine burette, a proportioning pump for the liquid amine burette, and a pressure regulator for the acetylene gas burette.

One-hundred fifty grams of anhydrous n-hexane, 59.4 grams of paraformaldehyde (90% trioxymethylene), which have been desiccated over sodium hydroxide pellets, and 6.0 grams of anhydrous powdered cupric chloride are charged to the autoclave liner. The autoclave is assembled, and pressure tested by purging with nitrogen. The system is then purged with acetylene, bled off to 25 p.s.i.g., and then heated to 60° C. Acetylene is then added to bring the pressure up to 150 to 175 p.s.i.g. and maintained at this pressure throughout the reaction by means of the gas burette and pressure regulator. The acetylene used is purified by passing it through a Dry Ice trap and activated alumina.

Normal butyl amine in the amount of 142 grams is added to the resulting mixture at a uniform rate of about 0.79 gram/minute by means of a proportioning pump over a period of about six hours. The proportioning pump is used to insure a uniform rate of addition. At the completion of the amine addition, the reaction is continued until no more acetylene is taken up. This point is reached approximately one hour after completion of the amine addition. The mixture is then cooled and discharged from the autoclave.

The mixture is filtered through a medium sintered glass Buchner funnel. The small filter cake obtained is washed once with a small portion of n-hexane and the filter cake is discarded. Caution is necessary to insure that the filter cake is not allowed to dry. After washing, dilute hydrochloric acid is added immediately to destroy any copper acetylide present.

A small water layer which appears in the filtrate is separated and discarded.

The hexane layer is then distilled through a small Vigreux column under reduced pressure with the pressure being lowered gradually as the distillation progresses. A nitrogen atmosphere is maintained during the distillation. The main reaction product is dipropargyl n-butyl amine. The yield of this material is 24.0%. Small amounts of monopropargyl n-butyl amine are also recovered.

*Example 2*

Example 1 is repeated, with the exception that tertiary butylamine is substituted for n-butylamine. Good yields of monopropargl t-butylamine and dipropargyl t-butylamine are obtained.

The acetylenic amino nitrogen compounds described herein are valuable initial materials for the preparation of solvents, pharmaceuticals and dyestuffs. By themselves the acetylenic amino nitrogen compounds are effective corrosion inhibitors. Condensation products made therefrom are useful as pickling inhibitors, and the materials themselves may also be used as high energy fuels.

The invention in its broadest aspects is not limited to the specific compositions, steps and methods described, but departures may be made therefrom within the scope of the accompanying claims without departing from the principles of the invention and without sacrificing its chief advantages.

We claim:

1. A process for preparing dialkynyl amines which comprise forming an anhydrous mixture of paraformaldehyde, an inert hydrocarbon solvent, and a catalyst selected from the group consisting of catalytically-active salts and acetylides of the heavy metals of subgroups I–B and II–B of the Periodic Table of Elements, adding an atmosphere of acetylene on said mixture, and gradually adding to said mixture a primary hydrocarbyl amine having up to 20 carbon atoms, said amine being selected from the group consisting of aliphatic amines and monocyclic aromatic amines, and mixtures of the foregoing, said amine being added to said mixture at a uniform rate and at a temperature between about 40° C. and 90° C. and a pressure between about 2 and 40 atmospheres, the rate of addition of said amine being such that substantially no excess of unreacted amine is present in said reaction mixture.

2. The method of claim 1, wherein the amount of unreacted amine in the reaction mixture is less than about 25 mole percent based upon the unreacted paraformaldehyde present in said mixture.

3. The method of claim 1, wherein the amount of unreacted amine in the reaction mixture is maintained below about 10 mole percent based upon the unreacted paraformaldehyde present in said mixture.

4. The method of claim 1, wherein the rate of addition of the amine per minute per mole of paraformaldehyde in the reaction mixture is between about 0.0005 and 0.15.

5. The method of claim 3, wherein said rate of addition is between about 0.0025 and 0.030 moles of amine per minute per mole of paraformaldehyde in the reaction mixture.

6. The method of claim 1, including the steps of continuing the reaction until substantially no acetylene is taken up by the reaction mixture.

7. The method of claim 1, wherein the temperature is between about 50° C. and 60° C., and the pressure is between about 125 and 250 p.s.i.g.

8. The method of claim 1, wherein the hydrocarbon solvent is a saturated hydrocarbon having 5 to 19 carbon atoms.

9. The method of claim 1, wherein the catalyst is cupric chloride.

10. The method of claim 1, wherein enough of said amine is added to provide a molar ratio of said amine to paraformaldehyde of between about 1 and 1.1:1, said ratio being based upon HCHO.

11. A process for preparing dialkynyl amines which comprises forming an anhydrous mixture of paraformaldehyde, an inert hydrocarbon solvent, and a catalyst selected from the group consisting of catalytically-active salts and acetylides of the heavy metals of subgroups I–B and II–B of the Periodic Table of Elements, adding an atmosphere of acetylene on said mixture, and gradually adding to said mixture a primary hydrocarbyl amine having up to 20 carbon atoms, said amine being selected from the group consisting of aliphatic amines, monocyclic aromatic amines, and mixtures of the foregoing, said amine being added to said mixture at a uniform rate and at a temperature between about 40° C. and 90° C. and a pressure between about 2 and 40 atmospheres, the rate of addition of said amine being such that substantially no excess of said unreacted amine is present in said reaction mixture, the amount of unreacted amine in the reaction mixture being less than about 25 mole percent based upon the unreacted paraformaldehyde present in said mixture, the rate of addition of the amine per minute per mole of paraformaldehyde in the reaction mixture being between about 0.0005 and 0.15, the temperature being between about 40° and 90° C. and the pressure being between about 2 and 40 atmospheres, and the hydrocarbon solvent being a saturated hydrocarbon having 5 to 19 carbon atoms, and continuing the reaction until substantially no acetylene is taken up by the reaction mixture.

12. A process for preparing dialkynyl amines which comprises forming an anhydrous mixture of paraformaldehyde, an inert hydrocarbon solvent, and a catalyst selected from the group consisting of catalytically-active salts and acetylides of the heavy metals of subgroups I–B and II–B of the Periodic Table of Elements, adding an atmosphere of acetylene on said mixture, and gradually adding to said mixture a primary hydrocarbyl amine having up to 20 carbon atoms, said amine being selected from the group consisting of saturated aliphatic amines, monocyclic aromatic amines, and mixtures of the foregoing, said amine being added to said mixture at a uniform rate and at a temperature between about 40° C. and 90° C. and a pressure between about 2 and 40 atmospheres, the rate of addition of said amine being such that substantially no excess of said unreacted amine is present in said reaction mixture, the amount of unreacted amine in the reaction mixture being maintained below about 10 mole percent based upon the unreacted paraformaldehyde present in said mixture, said rate of addition being between about 0.0025 and 0.030 mole of amine per minute per mole of paraformaldehyde in the reaction mixture, the temperature being between about 50° and 60° C., the pressure being between about 125 and 250 p.s.i.g., the hydrocarbon solvent being a saturated hydrocarbon having 5 to 19 carbon atoms, and enough of said amine being added to provide a molar ratio of said amine to paraformaldehyde of between about 1 and 1.1:1, said ratio being based upon HCHO, and continuing the reaction until substantially no acetylene is taken up by the reaction mixture.

References Cited

UNITED STATES PATENTS 2,273,141   2/1942   Reppe et al. _____ 210—583

CHARLES B. PARKER, *Primary Examiner.*

JOSEPH P. BRUST, *Examiner.*

D. PHILLIPS, *Assistant Examiner.*

UNITED STATES PATENT OFFICE
CERTIFICATE OF CORRECTION

Patent No. 3,375,279

March 26, 1968

James F. Vitcha et al.

It is certified that error appears in the above identified patent and that said Letters Patent are hereby corrected as shown below:

Column 1, line 62, "M" should read -- R --. Column 4, line 28, "primarily" should read -- primary --. Column 5, line 11, "monopropargl" should read -- monopropargyl --.

Signed and sealed this 19th day of August 1969.

(SEAL)
Attest:

Edward M. Fletcher, Jr.
Attesting Officer

WILLIAM E. SCHUYLER, JR.
Commissioner of Patents